Oct. 17, 1950 C. C. S. LE CLAIR 2,526,373
MEANS FOR CONTROLLING ELECTRIC MOTORS
Filed Aug. 5, 1947
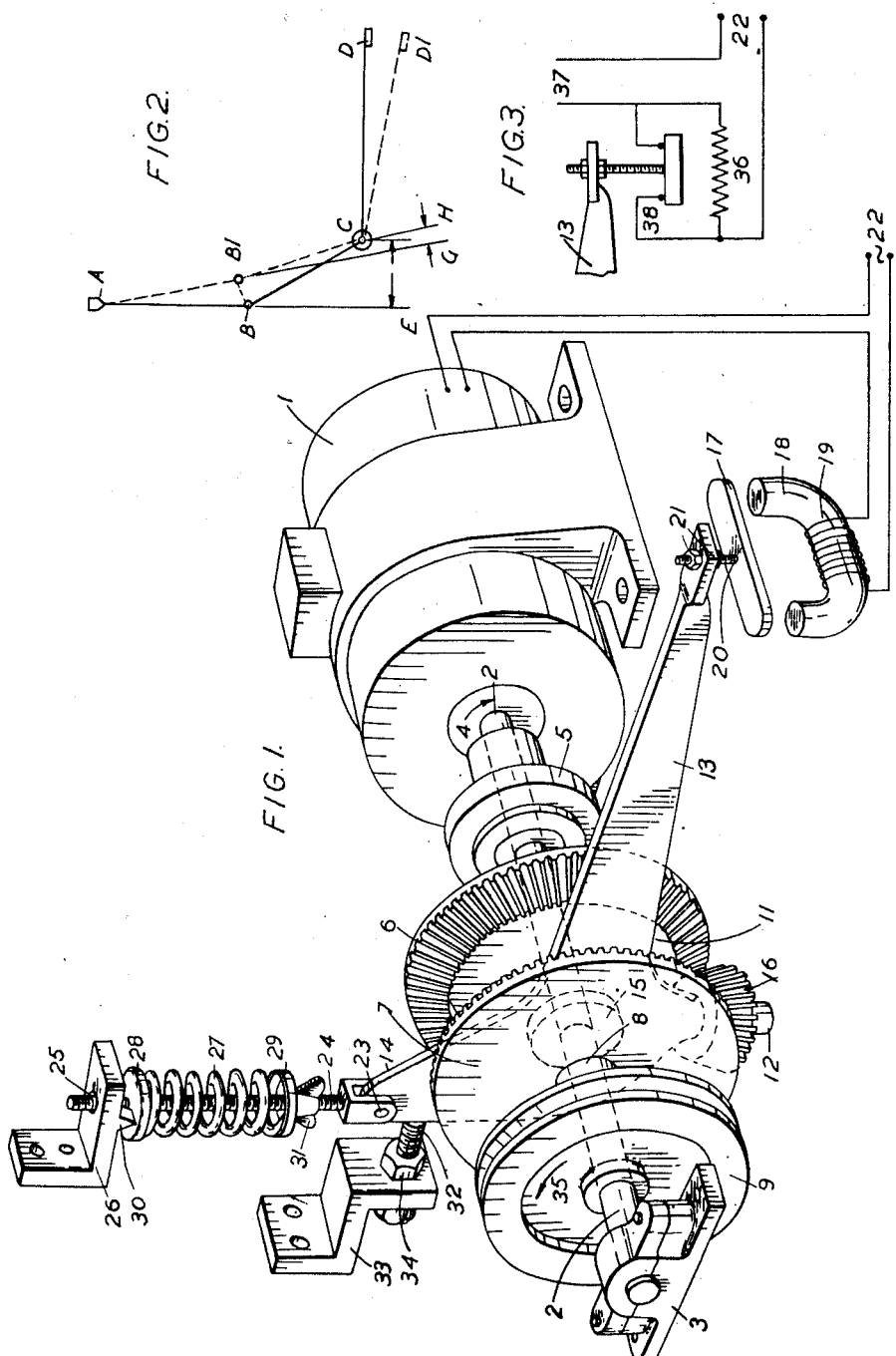
Inventor:
Camille Clare Sprankling Le Clair
By Hinkle, Horton, Ahlberg & Wupper
Attorneys.

Patented Oct. 17, 1950

2,526,373

UNITED STATES PATENT OFFICE 2,526,373

MEANS FOR CONTROLLING ELECTRIC MOTORS

Camille Clare Sprankling Le Clair, Acton, London, England, assignor to Tecalemit Limited, Brentford, England, a corporation of Great Britain Application August 5, 1947, Serial No. 766,187
In Great Britain August 21, 1946

17 Claims. (Cl. 318—475)

This invention relates to control gear for electric motors and is concerned more particularly with control gear which is intended for use with motors which operate with a variable load.

One example of such a case is when a motor is used to drive a pump the output of which is controlled. The invention is not, however, limited to such an arrangement since it is capable of being adapted to a wide range of uses.

It is one of the objects of the invention to provide means responsive to the load on the motor which will prevent overheating and consequent damage to the motor should the load exceed a predetermined value.

A further object of the invention is the provision of means which will automatically reduce the current in the motor when the load exceeds a predetermined value, thus causing the motor to stall, and which will allow the motor to restart upon the load decreasing to a suitable value.

The control gear according to the invention comprises a torque-responsive device which is responsive to the load torque and control means operated thereby and included in the motor circuit for reducing the current through the motor when the load torque exceeds a predetermined value.

According to a preferred embodiment of the invention, which is intended for use with an alternating current electric motor, the control gear comprises a torque-responsive device which is responsive to the load torque, control means including a variable inductive impedance included in the motor circuit and means connecting the torque-responsive device with the control means for increasing the impedance when the load torque exceeds a predetermined value.

The said impedance may comprise a magnetic core having an inductive winding thereon, in which case the inductance of the winding and thus the value of the impedance can be varied by varying the reluctance of the magnetic circuit. This arrangement offers the great advantage of avoiding the need for employing any switches or contact breakers in the motor circuit.

The torque-responsive device may take a number of forms but according to one arrangement it comprises a differential gear through which the drive from the motor is transmitted to the load. A differential gear for the purpose of this specification may be defined as an assembly of three elements, comprising two wing members, which may take the form of bevel wheels mounted co-axially facing one another, and a centre member which floats between the wing members and which, in this case, takes the form of a bevel pinion turnably mounted on a spindle radial to the axis of the wing members with the teeth of both of which it meshes.

In one construction, one wing member of this differential gear is connected to the motor shaft and is driven thereby, the second wing member is connected to the load and the centre member is connected with the said control means, the arrangement being such that the drive from the first wing member to the second wing member is transmitted through the centre member, the resulting reaction on the centre member being transmitted, for example, by a lever member, to the control means.

For a better understanding of the invention the same will now be more fully described, by way of example, reference being made to the accompanying drawings.

In the drawings:

Figure 1 is a partly diagrammatic perspective view showing an alternating current electric motor and the control gear associated therewith;

Figure 2 is a diagram illustrating the geometrical features of the arrangement and operation of the gear shown in Figure 1;

Figure 3 is a detail view illustrating a modification.

Referring first to Figure 1 of the drawings, an A. C. motor of any suitable type is shown at 1, its shaft being indicated at 2. This shaft is extended well beyond the end of the motor, its end being supported in a suitable bearing such as that indicated at 3.

For reasons that will appear hereinafter, it may be necessary to provide means for ensuring that the motor 1 can only rotate in one direction, for example, a clockwise direction as indicated by the arrow 4, in which case a unidirectional device such as 5 is provided. One part of this device is coupled to the shaft 2 while the other or body part is non-rotatably mounted on or housed in some fixed support (not shown).

In this construction the torque-responsive device comprises a differential gear of the type already referred to. One wing member of this differential is constituted by a bevel gear 6 which is secured to the shaft 2, while the second wing member of the differential is constituted by a similar bevel gear 7 which is mounted on the shaft 2 so as to be freely rotatable thereon. A sleeve 8, also rotatable on the shaft 2, is positively connected with the gear 7 and carries a pulley or other driving element 9 through which the drive is transmitted to the motor load (not shown). This load may, for example, be a pump the output of which is controlled by factors outside the scope of this specification.

The centre or intermediate member of the differential comprises a lever member 11 which in the construction shown has three arms 12, 13 and 14. The member 11 is attached to a boss 15 which is turnably mounted on the shaft 2 between the gears 6 and 7.

The arm 12 is formed into a stub spindle upon which a planet wheel 16, which meshes with the gears 6 and 7, is rotatably mounted. This planet wheel 16 provides the driving connection between the gear wheel 6, which is driven by the motor 1, and the driving pulley 9 from which the drive is conveyed to the load. While only one planet wheel has been shown in the drawing it would clearly be possible to provide two or more such wheels suitably mounted on the member 11.

The second arm 13 of the member 11 is shown as being arranged substantially horizontally. It carries at its end a soft iron armature 17 which is adapted to bridge the poles of an iron core 18 of an inductive winding 19. The connection between the armature 17 and the arm 13 comprises a threaded stud 20 which is fixed and the armature and which passes through a hole in the arm 13, being held in position in the latter by means of a pair of nuts 21. By adjusting the position of these nuts on the stud 20 the position of the armature 17 relatively to the arm 13 may be varied as required. This limits the possible movement of the member 11 in the clockwise direction and also determines the maximum air gap between the armature 17 and the core 18. The motor 1 is supplied from an A. C. supply indicated at 22 and the winding 19 is connected in series in the motor circuit.

The third arm 14 of the lever member 11 is pivotally connected at 23 to the lower end of a threaded push rod 24, the upper end of which passes with a small clearance through a hole 25 in a fixed bracket 26.

A compression spring 27 is mounted on the rod 24, its ends being fitted in spring cups 28 and 29 which fit loosely on the rod. The upper cup 28 engages against a knife-edge abutment 30 on the bracket 26, while the lower cup 29 rests on a wing nut 31 by means of which the compression of the spring 27 can be adjusted. The spring 27, acting between the fixed abutment 30 and the wing nut 31 on the rod 24, presses downwardly on the arm 14 and thereby produces a turning moment on the lever member 11 in a counter-clockwise direction.

To limit the movement of the lever member 11 in this direction an adjustable stop is provided comprising a threaded stud 32 which is screwed into a fixed bracket 33 and the end of which is engaged by the arm 14. A locking nut 34 is provided on the stud 32 to enable it to be locked in its adjusted position.

It will be noted that when the arm 14 is engaging the stud 32 the armature 17 is withdrawn from the poles of the core 18. This is the normal position of the parts which they assume when the motor is switched off or when it is running normally.

If the motor is stated up under no load or under a light or normal load it will drive the gear wheel 6 which, acting through the planet wheel 16, will in turn drive the gear-wheel 7 and with it the driving pulley 8. The pulley 9 will rotate in the reverse or counterclockwise direction as is indicated by the arrow 35.

The clockwise reaction thus produced on the lever member 11 is not as yet sufficient to turn it against the action of the spring 27 and thereby to bring the armature 17 into contact with the poles of the core 18. Consequently the parts remain in the position shown in which the arm 14 butts against the screw 32 and in which there is a maximum width of air gap between the armature 17 and the poles of the core 18. In this position of the armature the impedance to the magnetic flux in the magnetic circuit (i. e. the reluctance of the circuit) is a maximum and consequently the impedance of the winding 19 in the motor circuit is a minimum. With a suitable design this latter impedance can be made so small as to have a negligible effect on the motor supply. Thus the current flowing in the motor will be determined by the motor characteristics and by the load torque, as is well known.

Supposing now that the load torque increases, due for example to the output of a pump driven by the motor being restricted. This will cause the reaction of the planet wheel 16 on the lever member 11 to increase until eventually it becomes sufficient to overcome the force of the spring 27 and to rock the member 11 in a clockwise direction, thus bringing the armature 17 into contact with the poles of the core 18. This completes the magnetic circuit and thus increases the impedance of the winding 19. This reduced the current through the motor to a very small value and as a result causes the motor to stall. The design of the motor should be such that it can safely be left in the stalled condition without risk of damage through overheating and with an expenditure of current which, with suitable design, can be extremely small.

Reference will now be made to Figure 2 of the drawings which is purely geometric and shows the relative angular positions of the parts.

In Figure 2, A indicates the abutment 30, B indicates the pivotal connection 23, C indicates the axis of the shaft 2 and D indicates the end of the lever arm 13, the parts being shown in full lines in their normal positions as in Figure 1. Thus the full line A—B represents the rod 24, B—C represents the lever arm 14 and C—D represents the lever arm 13. B—E is an extension of the line A—B, while C—F is a line parallel to the line B—E and drawn through the point C.

When, as previously described, the member 11 is caused to rock in a clockwise direction to bring the armature 17 against the core 18 the parts assume the positions shown in broken lines in Figure 2, A—B1, B1—C and C—D1 representing the new positions of the rod 24, and of the lever arms 14 and 13, respectively, B1—G is an extension of the line A—B1, while C—H is a line drawn parallel to it through the point C.

With the parts in their normal positions the turning moment exerted by the spring 27 on the lever member 11 is the force exerted by the spring multiplied by the distance E—F which is the effective radius of the arm 14.

When, owing to an increase in the load torque, the reaction on the pinion 16 becomes sufficient to overcome this moment the lever member 11 rocks, compressing the spring 27. This increases the force exerted by the spring but at the same time the effective radius at which this force acts is rapidly reduced, so much so that a state of unstable equilibrium is set up. Consequently as soon as any movement at all of the member 11 takes place this member completes its full travel until stopped by the armature 17 coming up against the core 18.

In this final position, in which the positions of the arms 14 and 13 are represented by the broken lines B1—C and C—D1 in Figure 2, the effective radius at which the spring 27 acts on the arm 14 is represented by the distance G—H. This distance is so small that, in spite of the somewhat increased force by the spring, the turning moment is so much reduced that the force of the motor, even when stalled and with the reduced current flowing through it, is sufficient to hold the parts in their deflected positions.

If the load torque is now removed, or at least reduced to a value well below that at which the motor stalled (for example by the pressure in the pump delivery line falling) the spring 27 returns the lever member 11 to its original position with the arm 14 against the stop 32 and with the armature 17 withdrawn from the core 18. This reduces the impedance of the winding 19 and this allows the motor again to work on full power.

It will be apparent that with a suitable choice of motor and by suitable dimensioning of the parts, it is possible to obtain a wide range of operating conditions varying from a state of unstable equilibrium as described to one of neutral or stable equilibrium as may be desired.

These conditions may be adjusted by means of the nut 31 which controls the initial compression of the spring 27 and also by means of the adjustable stop 32 and the adjustable mounting 20, 21 of the armature 17 on the arm 13. These last two controls determine the effective radii E—F and G—H and also the maximum air gap between the armature 17 and the core 18.

It will be understood that in bringing the armature 17 into contact with the core 18 energy is stored in the spring 27 and this energy is utilised when the load torque is removed to return the member 11 to its original position.

The unidirectional device 5 is not always necessary and may be omitted when not required. Its function is to prevent the motor 1 when stalled, and when as a result it is exerting little or no forward driving torque, from being driven in a reverse direction by the recoil of the load should the latter be of a reversible type. For example, if the load were a gear type pump and the control device were set to cut the motor out when the delivery head reached fifty feet, then immediately the motor cut out and the current in it reduced as described, the torque exerted by the motor would be greatly reduced and the gear pump acting as a water motor would run backwards, driving the electric motor 1 in the reverse direction.

While the arrangement described has the great advantage of avoiding the inclusion of any switching devices in the motor circuit the invention is not limited to this particular method of controlling the motor current. An alternative arrangement is shown in Figure 3.

In this figure the winding 19 is replaced by a resistive, inductive or other impedance such as is shown at 36. This impedance is connected in one of the leads between the supply 22 and the motor leads which in this figure are indicated at 37.

The impedance 36 is adapted to be shorted out, at least in part, by means of a switch 38, which is connected with the lever arm 13 in place of the armature 17. The arrangement is such that the switch 38 is normally closed, thus shorting the impedance 36 and allowing the normal motor current to flow.

When, however, the load increases sufficiently to rock the member 11 and with it the arm 13 the switch 38 is opened. This causes the impedance 36 to be included in the motor circuit and thus reduces the current in the motor to a safe value.

It will be apparent that when the impedance 36 is mainly resistive the control gear is equally suitable for D. C. and A. C. motors. In the case of A. C. only, however, it would obviously be possible to use a mainly inductive or even a capacitative impedance.

In a modified construction the lever member 11, comprising the arms 13 and 14 is attached to the bevel wheel 7 which consequently does not rotate, while the load is connected to the centre member of the differential, the lever member 11 being replaced, for example, by a pulley, or other driving wheel, which is used instead of the wheel 9 to transmit the drive to the load. This pulley will, of course, rotate in the same direction as the motor but at half the speed.

The reaction on the lever member attached to the wheel 7 will be in the reverse direction from that described.

I claim:

1. A control gear for an electric motor comprising a torque responsive device which is responsive to the load torque of the motor, a circuit for supplying electric current to the motor from a source of current, said circuit including means operable to vary the impedance therein to regulate the current to the motor, and actuating means connecting said torque responsive device with said impedance varying means, said actuating means being adapted, upon the load torque exceeding a predetermined value, to cause said impedance varying means to operate to reduce the current to the motor to a value sufficient to cause the motor to continue to exert a driving torque while stalled and which is not great enough to cause overheating of the motor, and being adapted, upon the load torque falling, automatically to cause said impedance varying means to reduce the impedance in said circuit to cause the motor to restart.

2. A control gear for an alternating current electric motor comprising a torque responsive device which is responsive to the load torque of the motor, a circuit for supplying electric current to the motor from a source of alternating current, said circuit including a variable inductive impedance, means operable to vary said impedance, and actuating means connecting said torque responsive means with said impedance varying means, said actuating means being adapted, upon the load torque exceeding a predetermined value, to cause said impedance varying means to operate to reduce the current to the motor to a value sufficient to cause the motor to continue to exert a driving torque while stalled but which is not great enough to cause overheating of the motor, and being adapted, upon the load torque falling, automatically to cause said impedance varying means to reduce the impedance in said circuit to cause the motor to restart.

3. A control gear for an alternating current electric motor comprising a torque responsive device which is responsive to the load torque of the motor, a circuit for supplying electric current to the motor from a source of alternating current, said circuit having an inductive winding therein, a magnetic core for said winding, means for varying the reluctance of the magnetic circuit and thereby to vary the inductance of said winding, and actuating means connecting said torque responsive device with said reluctance varying means, said actuating means being adapted, upon the load torque exceeding a predetermined value, to operate said reluctance varying means to increase the inductance of said winding to reduce the current to the motor to a value sufficient to cause the motor to continue to exert a driving torque while stalled but which is not great enough to cause overheating of the motor, and being adapted, upon the load torque falling, automatically to operate said reluctance varying means to reduce the inductance in said winding to cause the motor to restart.

4. A control gear for an alternating current electric motor comprising a torque responsive device which is responsive to the load torque of the motor, a circuit for supplying electric current to the motor from a source of alternating current, said circuit having an inductive winding therein, a magnetic core for said winding, a movable armature for varying the reluctance of the magnetic circuit and thereby to vary the inductance of said winding, and actuating means connecting said torque responsive device with said armature, said actuating means being adapted, upon the load torque exceeding a predetermined value, to move said armature to increase the inductance of said winding to reduce the current to the motor to a value sufficient to cause the motor to continue to exert a driving torque while stalled but which is not great enough to cause overheating of the motor, and being adapted, upon the load torque falling, automatically to move said armature to reduce the inductance in said winding to cause the motor to restart.

5. A control gear for an electric motor comprising a torque responsive device which is responsive to the load torque of the motor, a circuit for supplying electric current to the motor from a source of current, said circuit having an impedance therein and means for short circuiting at least a part of said impedance, and actuating means connecting said torque responsive device with said short circuiting means, said actuating means being adapted upon the load torque exceeding a predetermined value, to render said short circuiting means ineffective thereby to increase the impedance in said circuit to reduce the current to the motor to a value sufficient to cause the motor to continue to exert a driving torque while stalled but which is not great enough to cause overheating of the motor, and being adapted, upon the load torque falling, automatically to render said short circuiting means effective, thereby to reduce the impedance in said circuit to cause the motor to restart.

6. A control gear for an electric motor comprising a torque responsive device which is responsive to the total load torque of the motor, said torque responsive device including a differential gear through which the drive from the motor is transmitted to the load, one element of the differential gear being connected to the motor shaft, a second element of the differential gear being connected to the load and a third element of the differential gear being arranged between said first two elements so that the drive of the motor applied to said first element and transmitted to said second element imposes a reaction on said third element, a circuit for supplying electric current to the motor from a source of current, said circuit including means operable to vary the impedance therein to regulate the current to the motor, and means connecting said third element of the differential gear with said impedance varying means, whereby, upon the load torque exceeding a predetermined value, the reaction on said third element causes said third element to actuate said impedance varying means to increase the circuit impedance to reduce the current to the motor to a value sufficient to cause the motor to continue to exert a driving torque while stalled but which is not great enough to cause overheating of the motor, and, upon the load torque falling again, automatically to actuate said impedance varying means to reduce the circuit impedance to increase the current to the motor to cause the motor to restart.

7. A control gear as claimed in claim 6, including stop means to limit the movement of said third element under the force of the reaction.

8. A control gear as claimed in claim 7, including means for adjusting the position of said stop means.

9. A control gear for an electric motor comprising a torque responsive device which is responsive to the total loading torque of the motor, said torque responsive device including a differential gear through which the drive from the motor is transmitted to the load, one element of the differential gear being connected to the motor shaft, a second element of the differential gear being connected to the load and a third element of the differential gear being arranged between said first two elements so that the drive of the motor applied to said first element and transmitted to said second element imposes a reaction on said third element, spring means acting on said third element to oppose the reaction on said third element, a circuit for supplying electric current to the motor from a source of current, said circuit including means operable to vary the impedance therein to regulate the current to the motor, and means connecting said third element of the differential gear with said impedance varying means, whereby, upon the load torque exceeding a predetermined value, the reaction on said third element overcomes the opposing force of said spring means to cause said third element to actuate said impedance varying means to increase the circuit impedance to reduce the current to the motor to a value sufficient to cause the motor to continue to exert a driving torque while stalled but which is not great enough to cause overheating of the motor, and, upon the load torque falling again, said spring means causes said third element to actuate said impedance varying means to reduce the circuit impedance to increase the current to the motor to cause the motor to restart.

10. A control gear for an electric motor comprising a torque responsive device which is responsive to the total loading torque of the motor, said torque responsive device including a differential gear through which the drive from the motor is transmitted to the load, one element of the differential gear being connected to the motor shaft, a second element of the differential gear being connected to the load and a third element of the differential gear being arranged between said first two elements so that the drive of the motor applied to said first element and transmitted to said second element imposes a reaction on said third element, spring means acting on said third element to oppose the reaction on said third element, means for adjusting the force exerted by said spring means, a circuit for supplying electric current to the motor from a source of current, said circuit including means operable to vary the impedance therein to regulate the current to the motor, and means connecting said third element of the differential gear with said impedance varying means, whereby, upon the load torque exceeding a predetermined value, the reaction on said third element overcomes the opposing force of said spring means to cause said third element to actuate impedance varying means to increase the circuit impedance to reduce the current to the motor to a value sufficient to cause the motor to continue to exert a driving torque while stalled but which is not great enough to cause overheating of the motor, and upon the load torque falling again, said spring means causes said third element to actuate said impedance varying means to reduce the circuit impedance to increase the current to the motor to cause the motor to restart.

11. In a control gear for an electric motor having a motor shaft and supplied with current from a source of current, a torque responsive device which is responsive to the load torque of the motor comprising a differential gear through which the drive from the motor is transmitted to the load, said differential gear having a first element connected to the motor shaft, a second element connected to the load and a third element arranged between said first two elements so that the drive of the motor applied to said first element and transmitted to said second element imposes a reaction on said third element, and a member operatively connected to said third element and arranged to vary the current supplied to the motor, said member being movable by said third element when the load torque exceeds a predetermined value and returning to normal position when the load torque falls below said predetermined value.

12. In a control gear for an electric motor having a motor shaft and supplied with current from a source of current, a torque responsive device which is responsive to the load torque of the motor comprising a differential gear through which the drive from the motor is transmitted to the load, said differential gear having a first element connected to the motor shaft, a second element connected to the load and a third element arranged between said first two elements so that the drive of the motor applied to said first element and transmitted to said second element imposes a reaction on said third element, a member operatively connected to said third element and arranged to vary the current supplied to the motor, said spring means acting on said member to oppose the reaction on said third element, said member being movable by said third element when the load torque exceeds a predetermined value and said spring means returning said member to normal position when the load torque falls below said predetermined value.

13. In a control gear for an electric motor having a motor shaft and supplied with current from a source of current, a torque responsive device which is responsive to the load torque of the motor comprising a differential gear through which the drive from the motor is transmitted to the load, said differential gear having a first element connected to the motor shaft, a second element connected to the load and a third element arranged between said first two elements so that the drive of the motor applied to said first element and transmitted to said second element imposes a reaction on said third element, a member operatively connected to said third element and arranged to vary the current supplied to the motor, spring means acting on said member to oppose the reaction on said third element, and means for adjusting the force exerted by said spring means, said member being movable by said third element when the load torque exceeds a predetermined value and returning to normal position when the load torque falls below said predetermined value.

14. In a control gear for an electric motor having a motor shaft and supplied with current from a source of current, a torque responsive device which is responsive to the load torque of the motor comprising a differential gear through which the drive from the motor is transmitted to the load, said differential gear having a first gear non-rotatably mounted on the motor shaft, a second gear connected to the load and a planet gear arranged between and meshed with both said first two gears so that the drive of the motor applied to said first gear and transmitted to said second gear imposes a reaction on said planet gear, a member rotatably mounted upon the motor shaft to be rotatable coaxially with both said gears, said planet gear being rotatably mounted on said member so that the reaction imposed upon said planet gear is transmitted to said member, said member having a first arm arranged to operate means to vary the current to said motor and having a second arm, and spring means engageable with said second arm to oppose movement of said member under the reaction imposed upon said planet gear, whereby said member will be moved to vary the current supplied to the motor when the load torque exceeds a predetermined value and said spring means will return said member to normal position when the load torque falls below said predetermined value.

15. In a control gear for an electric motor having a motor shaft and supplied with current from a source of current, a torque responsive device which is responsive to the load torque of the motor comprising a differential gear through which the drive from the motor is transmitted to the load, said differential gear having a first gear non-rotatably mounted on the motor shaft, a second gear connected to the load and a planet gear arranged between and meshed with both said first two gears so that the drive of the motor applied to said first gear and transmitted to said second gear imposes a reaction on said second gear, means mounted on said motor shaft for preventing reverse rotation of the motor through said differential gear, a member rotatably mounted upon the motor shaft to be rotatable coaxially with both said gears, said planet gear being rotatably mounted on said member so that the reaction imposed upon said planet gear is transmitted to said member, said member having a first arm arranged to operate means to vary the current to said motor and having a second arm, and spring means engageable with said second arm to oppose movement of said member under the reaction imposed upon said planet gear, whereby said member will be moved to vary the current supplied to the motor when the load torque exceeds a predetermined value and said spring means will return said member to normal position when the load torque falls below said predetermined value.

16. In a control gear for an electric motor having a motor shaft and supplied with current from a source of current, a torque responsive device which is responsive to the load torque of the motor comprising a differential gear through which the drive from the motor is transmitted to the load, said differential gear having a first gear non-rotatably mounted on the motor shaft, a second gear connected to the load and a planet gear arranged between and meshed with both said first two gears so that the drive of the motor applied to said first gear and transmitted to said second gear imposes a reaction on said second gear, a lever rotatably mounted upon the motor shaft to be rotatable coaxially with both said gears, said lever having a first arm on which said planet gear is rotatably mounted so that the reaction imposed upon said planet gear is transmitted to said lever, said lever having a second arm arranged to operate means to vary the current to said motor and having a third arm, and spring means engageable with said third arm to oppose movement of said lever under the reaction imposed upon said planet gear, whereby said lever will be moved to vary the current supplied to the motor when the load torque exceeds a predetermined value and said spring means will return said lever to normal position when the load torque falls below said predetermined value.

17. In a control gear for an electric motor having a motor shaft and supplied with current from a source of current, a torque responsive device which is responsive to the load torque of the motor comprising a differential gear through which the drive from the motor is transmitted to the load, said differential gear having a first gear non-rotatably mounted on the motor shaft, a second gear connected to the load and a planet gear arranged between and meshed with both said first two gears so that the drive of the motor applied to said first gear and transmitted to said second gear imposes a reaction on said second gear, a lever rotatably mounted upon the motor shaft to be rotatable coaxially with both said gears, said lever having a first arm on which said planet gear is rotatably mounted so that the reaction imposed upon said planet gear is transmitted to said lever, said lever having a second arm arranged to operate means to vary the current to said motor and having a third arm, spring means engageable with said third arm to oppose movement of said lever under the reaction imposed upon said planet gear, and means engageable with said second and third arms to limit the extent of movement of said lever, whereby said member will be moved to vary the current supplied to the motor when the load torque exceeds a predetermined value and said spring means will return said member to normal position when the load torque falls below said predetermined value.

CAMILLE CLARE SPRANKLING LE CLAIR.

REFERENCES CITED

The following references are of record in the file of this patent:

UNITED STATES PATENTS

| Number | Name | Date |
|---|---|---|
| 552,521 | Field | Jan. 7, 1896 |
| 829,371 | Darlington | Aug. 21, 1906 |
| 1,894,928 | Wesche | Jan. 17, 1933 |
| 2,387,047 | Weiss | Oct. 16, 1945 |
| 2,387,533 | Schmucker | Oct. 23, 1945 |